(12) United States Patent
Kami

(10) Patent No.: US 8,844,593 B2
(45) Date of Patent: Sep. 30, 2014

(54) PNEUMATIC TIRE

(75) Inventor: Kiyoshi Kami, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 377 days.

(21) Appl. No.: 13/175,625

(22) Filed: Jul. 1, 2011

(65) Prior Publication Data

US 2012/0000586 A1 Jan. 5, 2012

(30) Foreign Application Priority Data

Jul. 5, 2010 (JP) .................................. 2010-153192

(51) Int. Cl.
*B60C 11/11* (2006.01)
*B60C 11/03* (2006.01)
*B60C 11/04* (2006.01)

(52) U.S. Cl.
CPC ..... *B60C 11/0332* (2013.04); *B60C 2011/0346* (2013.04); *B60C 11/0309* (2013.04); *B60C 11/042* (2013.04); *B60C 11/0306* (2013.04); Y10S 152/902 (2013.01)
USPC ...................... 152/209.18; 152/902

(58) Field of Classification Search
USPC ............... 152/209.18, 209.21, 902; D12/516, D12/517, 548, 583, 587
See application file for complete search history.

(56) References Cited

U.S. PATENT DOCUMENTS

| | | | | |
|---|---|---|---|---|
| 4,412,576 A | * | 11/1983 | Nakajima | 152/209.18 |
| 5,301,727 A | * | 4/1994 | Inoue | 152/209.18 |
| 7,004,216 B2 | * | 2/2006 | Godefroid | 152/209.18 |
| 2004/0020577 A1 | * | 2/2004 | Hirai | 152/526 |
| 2004/0211501 A1 | * | 10/2004 | Kajita | 152/209.15 |

FOREIGN PATENT DOCUMENTS

| | | | |
|---|---|---|---|
| EP | 0654365 | * | 5/1995 |
| GB | 1499155 | * | 1/1978 |
| GB | 1524364 | * | 9/1978 |
| JP | 05-319024 | * | 12/1993 |
| JP | 8-113011 A | | 5/1996 |
| JP | 11-245630 A | | 9/1999 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire is provided in the tread portion with zigzag circumferential grooves and axial grooves so that a row of circumferentially arranged blocks is formed on each side of each of the zigzag circumferential grooves. Each of the zigzag circumferential grooves is composed of axially inner and outer circumferential segments and oblique segments. The axially inner and outer circumferential segments are arranged alternately in the tire circumferential direction. The oblique segments connect between the axially inner and outer circumferential segments, whereby the zigzag circumferential groove extends in the form of a trapezoidal wave. The zigzag amplitude is in a range of from 4 to 15% of a half tread width (Tw/2). The width of the zigzag circumferential groove is in a range of from 7 to 13% of the half tread width (Tw/2). The number of the axial grooves connected to each of the zigzag circumferential grooves on both side thereof is in a range of from 8 to 12 when counted in a tire footprint. The axial grooves each have a groove width WY of from 8 to 25% of a pitch length Py between the axial groove and the circumferentially adjacent axial groove.

9 Claims, 3 Drawing Sheets

PNEUMATIC TIRE

BACKGROUND OF THE INVENTION

The present invention relates to a pneumatic tire, more particularly to a tread pattern capable of improving mud performance without sacrificing noise performance and steering stability and thus suitable for sport-utility vehicles, pickup trucks and the like.

Usually, four-wheel-drive vehicles for use on paved or public roads as well as off paved roads, e.g. sport-utility vehicles, pickup trucks and the like, are provided with pneumatic tires having block-type tread patterns made up of a large number of blocks separated from each other by tread grooves to improve running performance on muddy roads (mud performance).

In order to improve the mud performance, a conventionally employed technique is to increase the percentage of the grooved area of the block-type tread pattern for example by increasing the widths of axial grooves.
However, if the percentage of the grooved area is increased, noise performance during running on paved roads is deteriorated. Further, as the rigidity of the blocks are decreased, the steering stability during running on paved roads is deteriorated. Thus, the mud performance and noise performance and the mud performance and steering stability are antinomic, and it has been believed to be difficult to improve these performances up to satisfactory levels.

The present inventor therefore, made a study on effects of circumferential and axial grooves on the mud performance. As a results, it was discovered that axial grooves do not function well to improve the traction on muddy roads because mud penetrating in the axial grooves remains undischarged during running, and the traction is produced mainly between the mud in the axial grooves and mud on the road surface, and that the axial grooves do not contribute to the improvement in the mud performance contrary to expectation. In the case of the circumferential groove, on the other hand, the mud therein can be discharged during running (or self-ejected) easier than the axial grooves. In the case of a straight circumferential groove, the mud within the groove slides in the groove and can not produce substantial traction. In the case of a zigzag circumferential groove, the mud within the groove is hard to slide in the groove and a shearing force from the mud on the road surface occurs to produce traction. As to the self-ejection of mud, the circumferential groove is superior to the axial grooves. As the circumferential groove is continuous in the circumferential direction, it can produce a relatively large shearing force continuously and stably during running.
In the case of the axial grooves, the penetration of the mud into the axial grooves is only from bottom up. But, in the case of the circumferential groove, the mud also enters from the front and from behind. In other words, the circumferential groove allows the mud to penetrate into the groove quickly, therefore, the mud can produce traction without delay.

As explained above, as to the degree of contribution to the traction, a circumferential groove is higher than axial grooves. Accordingly, to increase the shearing force by improving a zigzag configuration and a width of a circumferential groove is most effective for improving the mud performance. However, in order to effectively derive the function to increase the traction from the circumferential groove, it is necessary to even the ground pressure distribution, and the number of the axial grooves is an important factor therefor. If the number of the axial grooves is insufficient, then during running, the ground pressure measured in the vicinity of the circumferential groove becomes increased from one axial groove to the next axial groove, namely, between the axial grooves. As a result, the mud in this part of the circumferential groove between the axial grooves, becomes hard to be trodden down compactly, and the shearing force in this part decreases. Accordingly, the traction is decreased.

In order to avoid such decrease, it is necessary to even the ground pressure distribution by increasing the number of the axial grooves in the footprint of the tire. As explained, the axial grooves themselves do not increase the traction directly, therefore, it is possible to decrease the width of the axial grooves, and thereby it is possible to prevent the grooved area percentage from increasing even the number of the axial grooves is increased. As a result, the mud performance can be improved without sacrificing the noise performance and steering stability.

SUMMARY OF THE INVENTION

It is therefore, an object of the present invention to provide a pneumatic tire, in which the mud performance is improved without sacrificing the noise performance and steering stability.

According to the present invention, a pneumatic tire comprises a tread portion which is provided with zigzag circumferential grooves, axial grooves extending between the zigzag circumferential grooves, and axial grooves extending between the zigzag circumferential grooves and tread edges so that a row of circumferentially arranged blocks is formed on each side of each said zigzag circumferential groove, wherein each of the zigzag circumferential grooves is composed of axially inner circumferential segments, axially outer circumferential segments and oblique segments, wherein
 the axially inner circumferential segments and the axially outer circumferential segments are arranged alternately in the tire circumferential direction,
 the oblique segments connect between the axially inner circumferential segments and the axially outer circumferential segments, whereby the zigzag circumferential groove extends in the form of a trapezoidal wave,
 the zigzag amplitude measured axially between the widthwise center line of the inner circumferential segments and the widthwise center line of the outer circumferential segments is in a range of from 4 to 15% of a half tread width (Tw/2) measured axially between the tire equator and the tread edge,
 the width of the zigzag circumferential groove is in a range of from 7 to 13% of said half tread width (Tw/2),
 the number of the axial grooves connected to each said zigzag circumferential groove on both side thereof is in a range of from 8 to 12 when counted in a footprint of the tire, and
 the axial grooves each have a groove width WY in a range of from 8 to 25% of a pitch length Py between the axial groove and the circumferentially adjacent axial groove.

The above-mentioned tread edge is the axial outer edge of the ground contacting patch (camber angle=0) in a normally inflated loaded condition.

The footprint of the tire is that obtained in the normally inflated loaded condition (camber angle=0).

The normally inflated loaded condition is such that the tire is mounted on a standard wheel rim and inflate to a standard pressure and loaded with a standard tire load. The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under a normally inflated unloaded condition of the tire unless otherwise noted.

The normally inflated unloaded condition is such that the tire is mounted on the standard wheel rim and inflate to the standard pressure but loaded with no tire load.

In the present invention, the shearing force is obtained from the zigzag circumferential grooves having a trapezoidal wave configuration, therefore, the shearing force can be produced promptly as explained above. Further, as the zigzag amplitude and groove width are defined in relation to a half tread width, the shearing force obtained from the mud penetrating in the zigzag circumferential groove can be maximized. Furthermore, as the number of the axial grooves is defined, the ground pressure distribution is evened in the vicinity of the zigzag circumferential groove, and as a result, the mud in the zigzag circumferential groove is trodden down compactly to produce a large shearing force as explained above. Still furthermore, as the width of the axial grooves are decreased, undesirable increase in the grooved area percentage can be prevented, and it becomes possible to improve the mud performance without sacrificing the noise performance and steering stability as explained above.

DESCRIPTION OF THE PREFERRED EMBODIMENTS

Figure 1:
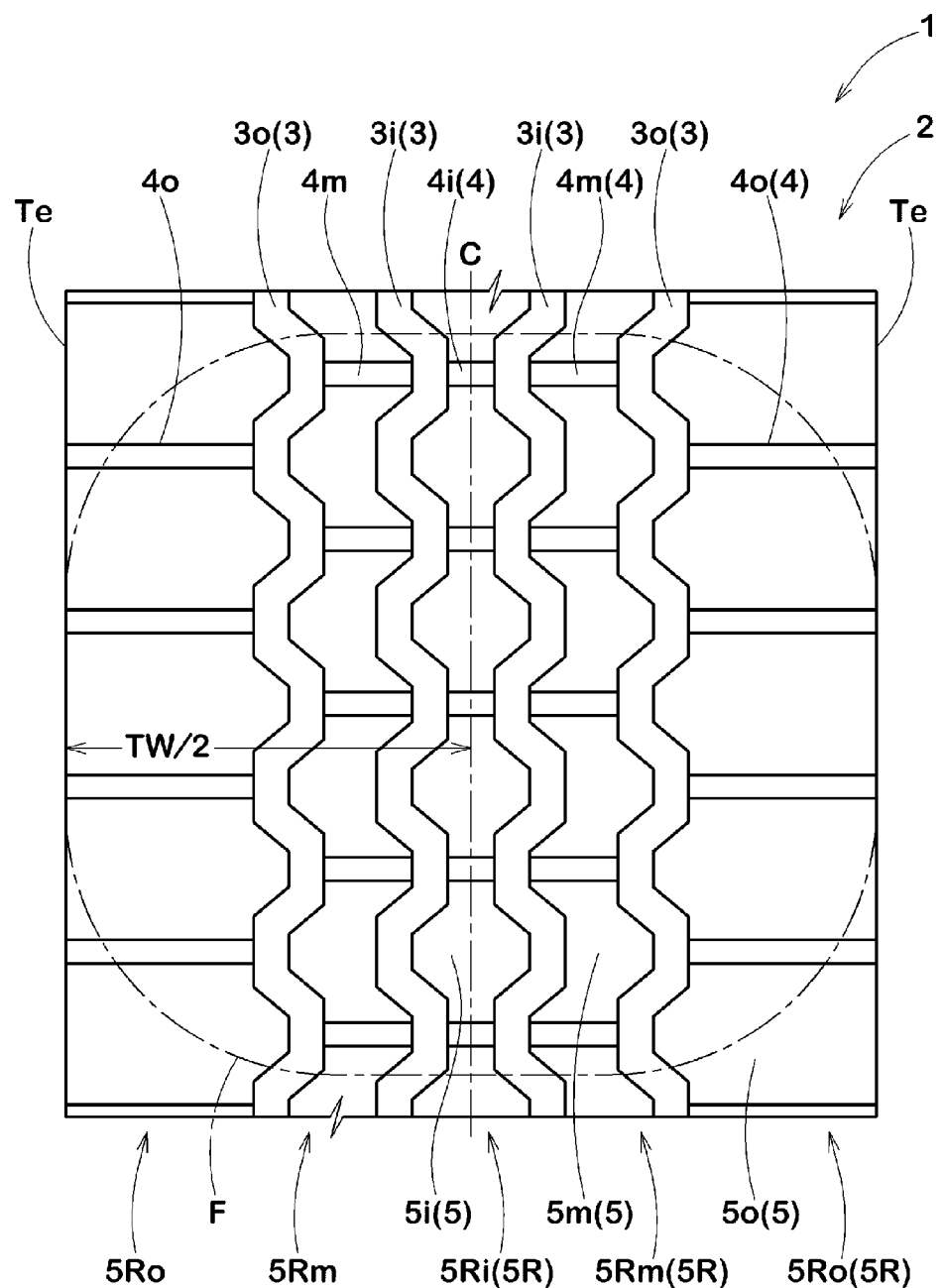
FIG. 1 is a developed view of a part of the tread portion of a pneumatic tire according to the present invention showing an example of the tread pattern.

Embodiments of the present invention will now be described in detail in conjunction with accompanying drawings.

According to the present invention, a pneumatic tire 1 comprises a tread portion 2, a pair of axially spaced bead portions, a pair of sidewall portions extending between the tread edges Te and the bead portions, a carcass extending between the bead portions, and a tread reinforcing belt disposed radially outside the carcass in the tread portion as usual.

The pneumatic tire 1 is provided in the tread portion 2 with: zigzag circumferential grooves 3 extending circumferentially of the tire; axial grooves 4 (4i, 4m) extending between the zigzag circumferential grooves 3; and axial grooves 4 (4o) extending between the zigzag circumferential grooves 3 and the tread edges Te.

Thereby, rows 5R (5Ri, 5Rm, 5Ro) of circumferentially arranged blocks 5 (5i, 5m, 5o) are formed on both sides of each of the zigzag circumferential grooves 3.

In particular, the pneumatic tire 1 in this embodiment is provided with a pair of axially inner zigzag circumferential grooves 3i disposed one on each side of the tire equator C, and a pair of axially outer zigzag circumferential grooves 3o one disposed axially outside each of the axially inner zigzag circumferential grooves 3i. Namely, only four zigzag circumferential grooves 3 are provided.

Between the two axially inner zigzag circumferential grooves 3i, the axial grooves 4i extend across the entire width between the grooves 3i and thereby a row 5Ri of the crown blocks 5i is formed.

Between each of the axially inner zigzag circumferential grooves 3i and the adjacent axially outer zigzag circumferential groove 3o, the axial grooves 4m extend across the entire width between the grooves 3i and 3o and thereby a row 5Rm of middle blocks 5m is formed.

Between each of the axially outer zigzag circumferential grooves 3o and the adjacent tread edge Te, the axial grooved 4o extend across the entire width therebetween and thereby a row 5Ro of the shoulder blocks 5o is formed.

Thus, the tread pattern in this embodiment is a block pattern made up of only the blocks 5 in five rows 5R.

Figure 2:
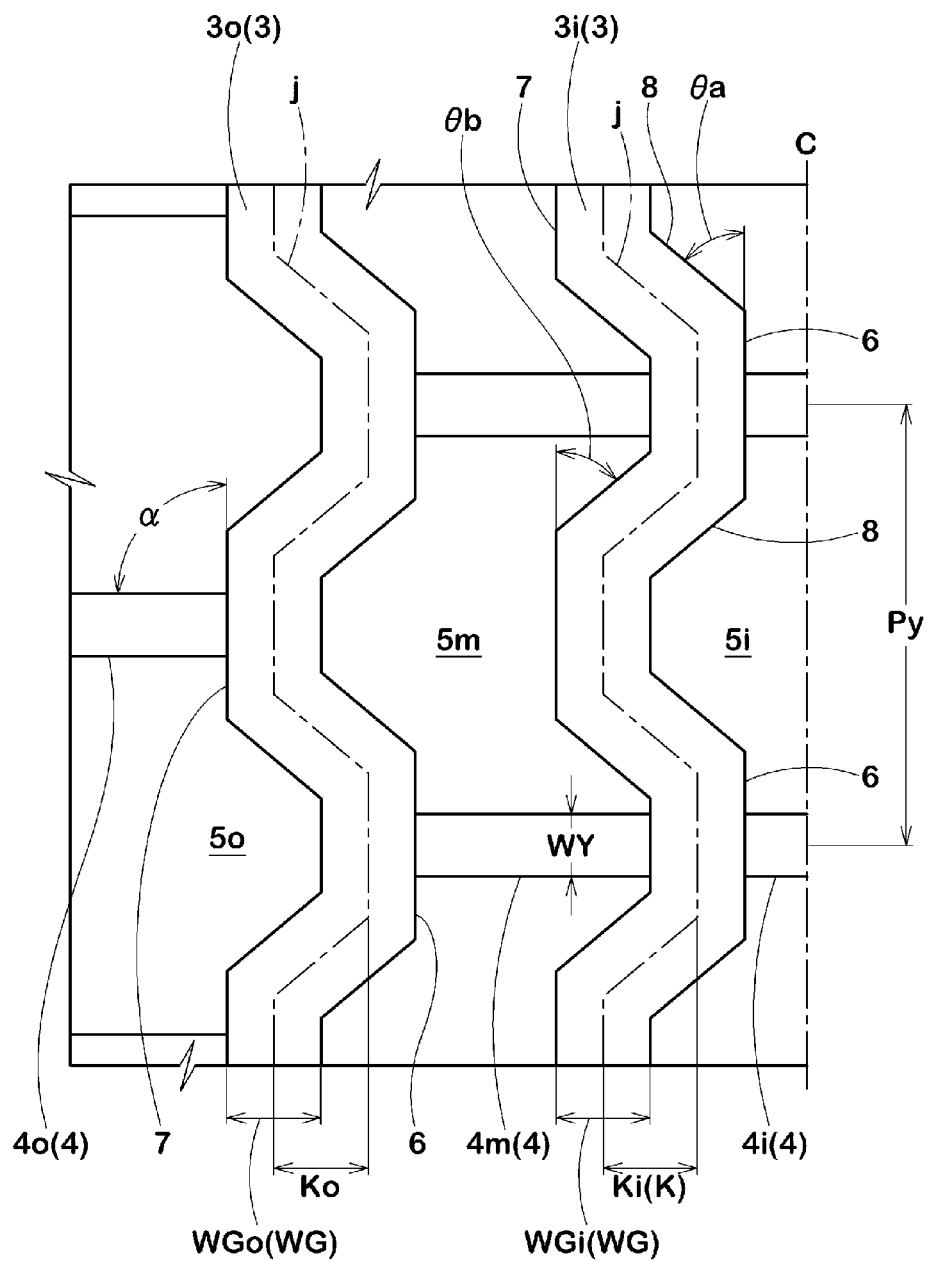
FIG. 2 is an enlarged view of a substantial part of the tread pattern.

As shown in FIGS. 1 and 2, each of the zigzag circumferential grooves 3 is extended in the form of a trapezoidal wave and composed of axially inner circumferential segments 6, axially outer circumferential segments 7, and oblique segments 8. The inner circumferential segments 6 and the outer circumferential segments 7 extend parallel with the tire circumferential direction. The inner circumferential segments 6 are disposed axially inside the outer circumferential segments 7. The inner circumferential segments 6 and the outer circumferential segments 7 are alternately arranged in the tire circumferential direction. The oblique segments 8 each extend between the circumferentially adjacent segments 6 and 7.

As the zigzag circumferential groove 3 in the form of such trapezoidal wave has the circumferential segments 6 and 7 extending straight in the tire circumferential direction, the self-ejection of mud is enhanced, and at the same time, it is possible to speed up penetration of mud into the groove and thereby it is possible to speed up generation of a shearing force against the mud on the road surface.

Further, as the circumferential segments 6 and 7 are connected through the oblique segments 8, the mud penetrating into the circumferential segments 6 and 7 does not slide along the longitudinal direction of the groove, and as a result, it is possible to produce a large shearing force.

Given that the zigzag amplitude K of the zigzag circumferential groove 3 is the axial distance between the widthwise center line j in the inner circumferential segments 6 and the widthwise center line j in the outer circumferential segments 7, the zigzag amplitude K is set in a range of not less than 4%, preferably not less than 5% but not more than 15%, preferably not more than 14% of a half tread width (Tw/2). Here, a half tread width (Tw/2) means the axial distance from the tire equator C to the tread edge Te.

The groove widths WG of the zigzag circumferential groove 3 are set in a range of not less than 7%, preferably not less than 8%, but not more than 13%, preferably not more than 12% of a half tread width (Tw/2).

If the zigzag amplitude K is less than 4% of a half tread width (Tw/2), then the mud penetrating into the groove becomes liable to slide along the groove, and as a result, it becomes difficult to produce a sufficient shearing force. If the zigzag amplitude K is more than 15%, the self-ejection of the mud is hindered, and the groove is liable to be filled up with the undischarged mud.

The angle θa between the inner circumferential segments 6 and the oblique segments 8 is set in a range of from 110 to 150 degrees. The angle θb between the outer circumferential segments 7 and the oblique segments 8 is set in a range of from 110 to 150 degrees. In one zigzag circumferential groove 3, the angle θa may be differed from the angle θb. But, in this example the angle θa is equal to the angle θb.

If the groove width WG is less than 7% of a half tread width (Tw/2), as the mass of the mud within the groove becomes narrow in width, the shearing force thereof is decreased, and it becomes difficult to improve the traction. If the groove width WG is increased over 13%, a further improvement of the traction is not possible. Rather the noise performance and steering stability are deteriorated.

In view of balance with wet performance, it is preferred that the zigzag amplitude Ki of the axially inner zigzag circumferential groove 3i is less than the zigzag amplitude Ko of the axially outer zigzag circumferential groove 3o.
Preferably, the zigzag amplitude Ki is in a range of from 90 to 96% of the zigzag amplitude Ko.
Also it is preferred that the groove width WGi of the axially inner zigzag circumferential groove 3i is less than the groove width WGo of the axially outer zigzag circumferential groove 3o. Preferably, the groove width WGi is in a range of from 90 to 96% of the groove width WGo.
On the tread shoulder side, higher grip performance is required during cornering, therefore, the groove width WGo is increased to increase the traction. Meanwhile, on the tread crown side, higher drainage performance is required under wet conditions, therefore, the zigzag amplitude K is decreased to smooth the drainage.

The number of zigzag pitches of the axially inner zigzag circumferential groove 3i is equal to that of the axially outer zigzag circumferential groove 3o. In this case, on each side of the tire equator, the phase of zigzag of the axially inner zigzag circumferential groove 3i may be circumferentially shifted from that of the axially outer zigzag circumferential groove 3o. But, it is preferable that these phases substantially coincide with each other.

In order that the zigzag circumferential grooves 3 effectively bring out their function to improve the traction, it is necessary that each of the zigzag circumferential grooves 3 is connected to the axial grooves 4 on both sides of the zigzag circumferential groove 3, and
the number n of the axial grooves 4 connected to one zigzag circumferential groove 3 on both sides thereof is set in a range of from 8 to 12 when counted in a footprint F of the tire in the normally inflated loaded condition.

By limiting the number n of the axial grooves 4 as explained above, the ground pressure distribution is evened around the zigzag circumferential grooves 3. Thereby, the mud in the zigzag circumferential grooves 3 can be trodden down compactly, and it becomes possible to obtain an increased shearing force from the compactly trodden mud. If the number n is less than 8, it becomes difficult to obtain the above effect. If the number n is more than 12, as the pattern rigidity is decreased, the steering stability is liable to deteriorate.

In order to avoid drawbacks of the increase in the number n such as an increased grooved area and the resultant deterioration in the noise performance and steering stability, the groove width WY of the axial groove 4 is set in a range of from 8 to 25% of the pitch length Py between the circumferentially adjacent axial grooves 4.

If the groove width WY is less than 8% of the pitch length Py, the mud whose viscosity is relatively high can not penetrate into the axial grooves 4 sufficiently, therefore, it becomes difficult to utilize the shearing force to improve the traction performance.
If the groove width WY is more than 25% of the pitch length Py, the overall grooved area percentage is excessively increased, and it becomes difficult to achieve the mud performance, noise performance and steering stability at the same time.

With respect to each of the zigzag circumferential grooves 3, the axial grooves 4 are connected to the circumferential segments 6 and 7 at the respective intermediate positions, and not connected to the oblique segments 8.

As the circumferential segments 6 and 7 extend straight in the tire circumferential direction, the mud within such segments 6 and 7 can be self-ejected easily during running. As the axial grooves 4 are connected to the circumferential segments 6 and 7, the mud penetrating into their junctions is increased in the volume and mass, therefore, the self-ejection of the mud due to the centrifugal force during running is further enhanced. Accompanying the self-ejection of the mud within the junction, the mud within the circumferential segments 6 and 7 connected to the junction is also ejected. Thus, in comparison with such a case that the axial grooves 4 are connected to the oblique segments 8, it is possible to further improve the self-ejection of mud from the zigzag circumferential groove 3. Further, the self-ejection of the mud within the junction also induces the ejection of the mud within the axial groove 4 connected to the junction, therefore, it is possible to improve the traction performance due to the axial grooves 4.

It is preferable that the entirety of each of the axial grooves 4 has a straight configuration or a smoothly curved configuration. In the case of the smoothly curved configuration, a circular arc whose radius is not less than 50 mm is preferred. As the entirety of the axial groove 4 has such a configuration, it becomes easy to self-eject the whole mud in the axial groove 4. As a result, the effect to induce the ejection of mud in the zigzag circumferential groove 3 is increased, and the self-ejection of mud from the zigzag circumferential groove 3 can be improved.

If the angle α of the axial grooves 4 with respect to the tire circumferential direction is small, as the axial groove 4 is increased in the length in the footprint F, the block rigidity is decreased, and the steering stability is liable to deteriorate. Therefore, the angle α of the axial groove 4 with respect to the circumferential direction is preferably not less than 45 degrees, more preferably not less than 60 degrees. But, in view of even ground pressure distribution, the angle α is preferably not more than 90 degrees, more preferably not more than 80 degrees.
In the case that the axial groove 4 has a curved configuration, it is preferable that the entire length of the axial groove 4 satisfies the limitation of the angle α.

In order to secure the rigidity of the shoulder blocks 5o, it is preferred that the axially outer axial grooves 4o are respectively connected to the outer circumferential segments 7 of the axially outer zigzag circumferential groove 3o.

In order to secure the rigidity of the crown blocks 5i, it is preferred that the axially inner axial grooves 4i are respectively connected to the inner circumferential segments 6 of the axially inner zigzag circumferential grooves 3*i*.

Figure 3A:
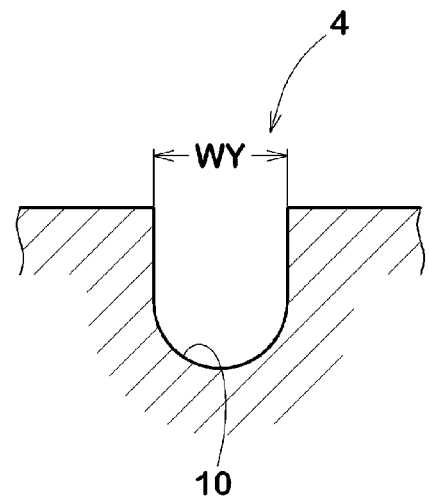
FIG. 3(a) is a cross sectional view of an axial groove having a semicircular cross section at the groove bottom.
Figure 3B:
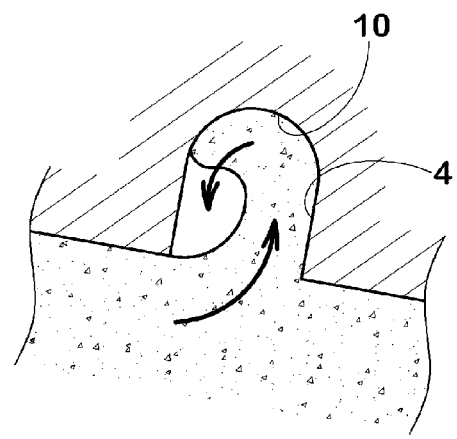
FIG. 3(b) is a cross sectional view for explaining a function of the semicircular groove bottom.
Figure 3C:
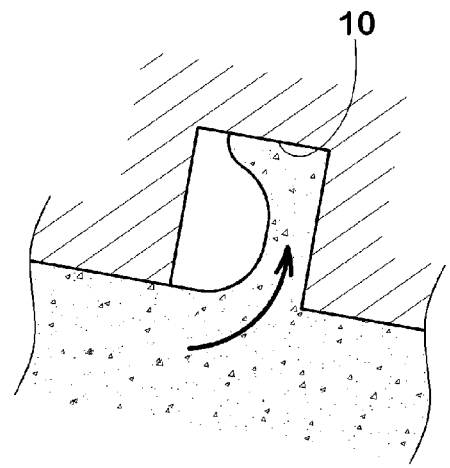
FIG. 3(c) is a cross sectional view for explaining a function of a flat groove bottom.

In order to secure the rigidity of the middle blocks 5*m*, it is preferred that the middle axial grooves 4*m* are respectively connected to the inner circumferential segments 6 of the axially outer zigzag circumferential groove 3*o*. The axially inner ends of the middle axial grooves 4*m* are connected to the circumferential segments 6 or circumferential segments 7 (in this embodiment the inner circumferential segments 6) of the axially inner zigzag circumferential groove 3*i*, depending on the difference in the zigzag phase between the zigzag circumferential grooves 3*i* and 3*o*, It is preferable that the axial grooves 4 each have a U-shaped cross section, wherein in the cross section perpendicular to the length direction of the axial groove, the groove bottom 10 is a semicircle as shown in FIG. 3(*a*).

By forming the groove bottom 10 as semicircular as explained above, as shown in FIG. 3(*b*), the mud entering from the opening of the groove can easily fill up the entire groove volume, and the whole volume of the mud can be easily discharged from the groove. This helps to improve the mud performance. As shown in FIG. 3(*c*), if the groove bottom 10 of the axial groove 4 is flat, the mud entering from the opening of the groove is hard to fill up the entire groove volume due to the resistance from the groove bottom 10, and the whole volume of the mud can not be discharged from the groove. Thus, the mud performance can not be fully improved.

Incidentally, the ground contacting top surfaces of the blocks 5 may be provided with sipes in various arrangements as needed.

Comparison Tests

Based on the tread pattern shown in Table 1, pneumatic tires were prepared and tested for the mud performance, noise performance and steering stability. All of the tires had same specifications except for the specifications shown in Table 1. Common specifications are as follows.

Grooved area: 30% of gross tread area
    circumferential grooves
        configuration: trapezoidal wave
        groove depth: 10.0 mm
    axial grooves
        configuration: straight
        groove depth: 10.0 mm
    tire size: 285/60R18
    rim size: 8.03

(1) Mud performance test: on a muddy road surface in a tire test course, a 4700 cc 4WD SUV provided on all wheels with the same test tires was run in order to measure 0-10 m time, namely, the time required for running 10 m distance, starting from zero speed. The conditions were as follows: the depth of mud was about 15 cm, the differential was locked, the transmission was locked in a low gear, the number of engine revolutions was kept at 3000 rpm, and the tire pressure was 230 kPa.

As the test results, the reciprocal number of each measured time in sec. is indicated in Table 1 by an index based on Embodiment tire Ex.1 being 100, wherein the larger the value, the better the mud traction performance.

(2) Noise performance test: According to the "Test Procedure for Tire Noise" specified in Japanese JASO-C606, the 4WD SUV was coasted for a distance of 50 m at a speed of 60 km/h in a straight test course (ISO road surface), and the maximum noise sound level dB(A) was measured with a microphone set at 1.2 meter height from the road surface and 7.5 meter sideways from the running center line in the midpoint of the course.

The test results are indicated in Table 1 by an index, wherein the difference of each measured sound level in dB(A) from that of Embodiment tire Ex.1 (=68 dB) was firstly computed. Then, on the assumption that the index number of Embodiment tire Ex.1 is 100 and the difference of 1 dB is 10 index, the test results are indicated. For example, 66 dB=80, 67 dB=90, 68 dB=100, 69 dB=110. Thus, the smaller the value, the better the noise performance.

(3) Steering stability test: During running the 4WD SUV on a dry asphalt road surface in the tire test course, the test driver evaluated the steering stability.

The results are indicated in Table 1 by an index based on Embodiment tire Ex.1 being 100, wherein the larger the value, the better the steering stability.

It was confirmed form the test results that, according to the present invention, the mud performance can be improved without deteriorating the noise performance and steering stability.

TABLE 1

| Tire | Ref.1 | Ref.2 | Ex.1 | Ex.2 | Ex.3 | Ex.4 | Ref.3 | Ref.4 | Ex.5 | Ex.6 |
|---|---|---|---|---|---|---|---|---|---|---|
| axially inner zigzag circumferential groove | | | | | | | | | | |
| angle θ between circumferential segment and oblique segment (deg.) | 130 | 130 | 130 | 130 | 130 | 130 | 130 | 130 | 130 | 130 |
| zigzag amplitude Ki (*1) | 8 | 2 | 4 | 8 | 12 | 15 | 18 | 8 | 8 | 8 |
| groove width WGi (*1) | 10 | 10 | 10 | 10 | 10 | 10 | 10 | 6 | 7 | 13 |
| axially outer zigzag circumferential groove | | | | | | | | | | |
| angle θ between circumferential segment and oblique segment (deg.) | 130 | 130 | 130 | 130 | 130 | 130 | 130 | 130 | 130 | 130 |
| zigzag amplitude Ko (*1) | 8 | 2 | 4 | 8 | 12 | 15 | 18 | 8 | 8 | 8 |
| groove width WGo (*1) | 10 | 10 | 10 | 10 | 10 | 10 | 10 | 6 | 7 | 13 |
| axial groove | nonexistent | | | | | | | | | |
| number n of axial grooves in footprint | — | 10 | 10 | 10 | 10 | 10 | 10 | 10 | 10 | 10 |
| groove width WY (*2) | — | 16 | 16 | 16 | 16 | 16 | 16 | 16 | 16 | 16 |
| groove bottom shape | — | semicircle | semicircle | semicircle | semicircle | semicircle | semicircle | semicircle | semicircle | semicircle |
| mud performance | 80 | 80 | 95 | 100 | 110 | 111 | 105 | 80 | 98 | 110 |

TABLE 1-continued

| Tire | Ref.5 | Ref.6 | Ex.7 | Ex.8 | Ref.7 | Ref.8 | Ex.9 | Ex.10 | Ref.9 | Ex.11 |
|---|---|---|---|---|---|---|---|---|---|---|
| noise performance | 110 | 110 | 105 | 100 | 97 | 93 | 80 | 105 | 102 | 95 |
| steering stability | 115 | 102 | 102 | 100 | 99 | 98 | 85 | 102 | 100 | 98 |
| axially inner zigzag circumferential groove | | | | | | | | | | |
| angle θ between circumferential segment and oblique segment (deg.) | 130 | 130 | 130 | 130 | 130 | 130 | 130 | 130 | 130 | 90 |
| zigzag amplitude Ki (*1) | 8 | 8 | 8 | 8 | 8 | 8 | 8 | 8 | 8 | 8 |
| groove width WGi (*1) | 15 | 10 | 10 | 10 | 10 | 10 | 10 | 10 | 10 | 10 |
| axially outer zigzag circumferential groove | | | | | | | | | | |
| angle θ between circumferential segment and oblique segment (deg.) | 130 | 130 | 130 | 130 | 130 | 130 | 130 | 130 | 130 | 130 |
| zigzag amplitude Ko (*1) | 8 | 8 | 8 | 8 | 8 | 8 | 8 | 8 | 8 | 8 |
| groove width WGo (*1) | 15 | 10 | 10 | 10 | 10 | 10 | 10 | 10 | 10 | 10 |
| axial groove | | | | | | | | | | |
| number n of axial grooves in footprint | 10 | 4 | 8 | 12 | 16 | 10 | 10 | 10 | 10 | 10 |
| groove width WY (*2) | 16 | 16 | 16 | 16 | 16 | 5 | 8 | 25 | 30 | 16 |
| groove bottom shape | semicircle | semicircle | semicircle | semicircle | semicircle | semicircle | semicircle | semicircle | semicircle | semicircle |
| mud performance | 115 | 85 | 100 | 105 | 107 | 90 | 100 | 105 | 107 | 93 |
| noise performance | 85 | 105 | 102 | 100 | 95 | 105 | 102 | 100 | 90 | 85 |
| steering stability | 85 | 105 | 102 | 98 | 90 | 105 | 102 | 98 | 90 | 90 |

| Tire | Ex.12 | Ex.13 | Ex.14 | Ex.15 | Ex.16 | Ex.17 | Ex.18 | Ex.19 | Ex.20 | Ex.21 |
|---|---|---|---|---|---|---|---|---|---|---|
| axially inner zigzag circumferential groove | | | | | | | | | | |
| angle θ between circumferential segment and oblique segment (deg.) | 110 | 150 | 170 | 130 | 130 | 130 | 130 | 130 | 130 | 130 |
| zigzag amplitude Ki (*1) | 8 | 8 | 8 | 8 | 8 | 8 | 8 | 8 | 8 | 8 |
| groove width WGi (*1) | 10 | 10 | 10 | 10 | 10 | 10 | 10 | 10 | 10 | 10 |
| axially outer zigzag circumferential groove | | | | | | | | | | |
| angle θ between circumferential segment and oblique segment (deg.) | 130 | 130 | 130 | 130 | 130 | 130 | 130 | 130 | 130 | 130 |
| zigzag amplitude Ko (*1) | 8 | 8 | 8 | 8.8 | 7.2 | 8 | 8 | 8.8 | 7.2 | 8 |
| groove width WGo (*1) | 10 | 10 | 10 | 10 | 10 | 11 | 9 | 11 | 9 | 10 |
| axial groove | | | | | | | | | | |
| number n of axial grooves within footprint | 10 | 10 | 10 | 10 | 10 | 10 | 10 | 10 | 10 | 10 |
| groove width WY (*2) | 16 | 16 | 16 | 16 | 16 | 16 | 16 | 16 | 16 | 16 |
| groove bottom shape | semicircle | semicircle | semicircle | semicircle | semicircle | semicircle | semicircle | semicircle | semicircle | flat |
| mud performance | 95 | 98 | 92 | 105 | 97 | 110 | 90 | 115 | 90 | 95 |
| noise performance | 95 | 100 | 105 | 90 | 105 | 85 | 105 | 80 | 90 | 95 |
| steering stability | 95 | 100 | 105 | 95 | 102 | 90 | 110 | 90 | 95 | 95 |

*1) percentage with respect to a half tread width (TW/2)
*2) percentage with respect to a pitch length Py between axial grooves

The invention claimed is:

1. A pneumatic tire comprising a tread portion which is provided with zigzag circumferential grooves, axial grooves extending between the zigzag circumferential grooves, and axial grooves extending between the zigzag circumferential grooves and tread edges, so that a row of circumferentially arranged blocks is formed on each side of each said zigzag circumferential groove, wherein each of the zigzag circumferential grooves is composed of axially inner circumferential segments, axially outer circumferential segments and oblique segments, the axially inner circumferential segments and the axially outer circumferential segments are arranged alternately in the tire circumferential direction, the oblique segments connect between the axially inner circumferential segments and the axially outer circumferential segments, whereby the zigzag circumferential groove extends in the form of a trapezoidal wave, the zigzag amplitude measured axially between the widthwise center line of the inner circumferential segments and the widthwise center line of the outer circumferential segments is in a range of from 4 to 15% of a half tread width (TW/2) measured axially between the tire equator and the tread edge, the width of the zigzag circumferential groove is in a range of from 7 to 13% of said half tread width (TW/2), the number of the axial grooves connected to each said zigzag circumferential groove on both sides thereof is in a range of from 8 to 12 when counted in a footprint of the tire, the axial grooves are connected to the circumferential segments at the respective intermediate positions of the lengths of the circumferential segments and not connected to the oblique segments, the axial grooves each have a groove width WY in a range of from 8 to 25% of a pitch length Py between the axial groove and the circumferentially adjacent axial groove, and each of the axial grooves has a U-shaped cross-sectional shape along the length thereof wherein the groove bottom is a semicircle.

2. The pneumatic tire according to claim 1, wherein in each said zigzag circumferential groove, angles θ between the circumferential segments and the oblique segments are in a range of from 110 to 150 degrees.

3. The pneumatic tire according to claim 1 or 2, wherein each said the axial groove has a straight configuration or alternatively a smoothly curved configuration.

4. The pneumatic tire according to claim 1 or 2, wherein said zigzag circumferential grooves are
an axially inner zigzag circumferential groove and
an axially outer zigzag circumferential groove
which are disposed on each side of the tire equator, and the zigzag amplitude of the axially inner zigzag circumferential groove is less than the zigzag amplitude of the axially outer zigzag circumferential groove.

5. The pneumatic tire according to claim 4, wherein
the groove width of the axially inner zigzag circumferential groove is less than the groove width of the axially outer zigzag circumferential groove.

6. The pneumatic tire according to claim 1, wherein
said zigzag circumferential grooves are an axially inner zigzag circumferential groove and an axially outer zigzag circumferential groove which are disposed on each side of the tire equator, and the axially inner zigzag circumferential groove and the axially outer zigzag circumferential groove are substantially parallel with each other.

7. The pneumatic tire according to claim 6, wherein
the axially inner zigzag circumferential grooves and the axially outer zigzag circumferential grooves are arranged symmetrically about the tire equator.

8. The pneumatic tire according to claim 7, wherein
the zigzag amplitude of the axially inner zigzag circumferential groove is less than the zigzag amplitude of the axially outer zigzag circumferential groove.

9. The pneumatic tire according to claim 1, wherein
the axial grooves are parallel with the tire axial direction.

* * * * *